(12) United States Patent
Finkemeyer

(10) Patent No.: US 10,144,129 B2
(45) Date of Patent: Dec. 4, 2018

(54) ROBOT, CONTROL DEVICE FOR A ROBOT, AND METHOD FOR OPERATING A ROBOT

(75) Inventor: Bernd Finkemeyer, Augsburg (DE)

(73) Assignee: KUKA Deutschland GmbH, Augsburg (DE)

( * ) Notice: Subject to any disclaimer, the term of this patent is extended or adjusted under 35 U.S.C. 154(b) by 0 days.

(21) Appl. No.: 13/426,854

(22) Filed: Mar. 22, 2012

(65) Prior Publication Data

US 2012/0265340 A1 Oct. 18, 2012

(30) Foreign Application Priority Data

Mar. 23, 2011 (DE) .................. 10 2011 005 985

(51) Int. Cl.
*G05B 19/04* (2006.01)
*G05B 19/18* (2006.01)
*B25J 9/16* (2006.01)

(52) U.S. Cl.
CPC ........... *B25J 9/1656* (2013.01); *B25J 9/1674* (2013.01); *G05B 2219/40204* (2013.01)

(58) Field of Classification Search
CPC .................. B25J 9/1656; B25J 9/1674; G05B 2219/40204
USPC .......................................................... 701/211
See application file for complete search history.

(56) References Cited

U.S. PATENT DOCUMENTS 4,604,560 A * 8/1986 Inagaki ................ G05B 19/232
318/563
6,329,779 B1 12/2001 Pimley et al.
6,734,581 B1 * 5/2004 Griffis .................... G05B 19/00
192/129 R
7,529,599 B1 5/2009 Bhatt et al.
2006/0276934 A1 * 12/2006 Nihei ..................... B25J 9/1656
700/245

(Continued)

FOREIGN PATENT DOCUMENTS

CN 1484807 A 3/2004
DE 43 33 952 A1 4/1995

(Continued)

OTHER PUBLICATIONS

German Patent Office; Search Report in German Patent Application No. 10 2011 005 985.7 dated Mar. 2, 2012; 5 pages.

(Continued)

*Primary Examiner* — Harry Y Oh
(74) *Attorney, Agent, or Firm* — Dorton & Willis, LLP

(57) ABSTRACT

The invention relates to a robot, a robot control device, and a method for operating a robot. The robot includes an arm having a plurality of members following one after the other, an attaching device for attaching an end effector and drives for moving the members, and a control device connected to the drives. In another aspect, a computer program running on the control device issues a command for the robot arm to carry out an application step. At least one abort condition of the command from a plurality of abort conditions is detected, the execution of the application step is aborted on the basis of the detected abort condition, and simultaneously with the detection of the abort condition information is passed to the computer program about the abort condition on the basis of which the execution of the application step was aborted.

10 Claims, 2 Drawing Sheets

(56) References Cited

U.S. PATENT DOCUMENTS

Figure 1:
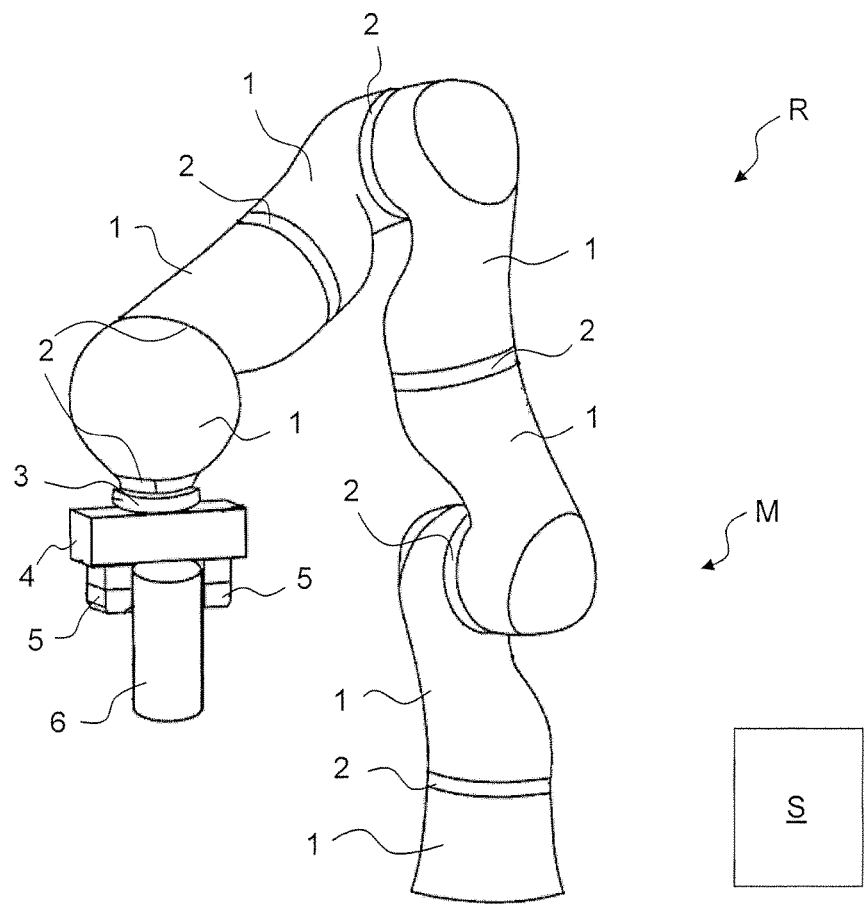

| | | | | |
|---|---|---|---|---|
| 2007/0282480 A1* | 12/2007 | Pannese | ............... | G05B 15/02 |
| | | | | 700/213 |
| 2010/0063514 A1* | 3/2010 | Maschke | ............. | A61B 5/1135 |
| | | | | 606/130 |
| 2010/0241270 A1* | 9/2010 | Eliuk | ...................... | A61J 1/20 |
| | | | | 700/216 |
| 2013/0345873 A1* | 12/2013 | Blumberg | ............. | B25J 9/0087 |
| | | | | 700/259 |

FOREIGN PATENT DOCUMENTS

| | | |
|---|---|---|
| DE | 195 33 604 A1 | 3/1997 |
| DE | 199 59 330 A1 | 6/2001 |
| DE | 103 00 605 A1 | 2/2004 |
| DE | 600 17 723 T2 | 6/2005 |
| EP | 1 168 126 A1 | 1/2002 |
| EP | 1 756 682 B1 | 2/2007 |
| EP | 1756682 B1 | 3/2011 |
| WO | 2005/061187 A1 | 7/2005 |

OTHER PUBLICATIONS

Chinese Patent Office; Office Action in related Chinese Patent Application No. 201210083112.9 dated Mar. 26, 2015; 14 pages.
Cox et al.; Publication entitled "Exception Handling in Robotics" published Mar. 1989; 7 pages.
Tzes.; Publication entitled "Intelligent Self-Tuning Controllers for Robot Manipulators" published Aug. 1990; 5 pages.
European Patent Office; Search Report in related European Patent Application No. 12159477.4 dated Apr. 15, 2015; 7 pages.
German Patent Office; Office Action in related German Patent Application No. 10 2011 005 985.7 dated Jun. 6, 2018; 5 pages.

* cited by examiner

ROBOT, CONTROL DEVICE FOR A ROBOT, AND METHOD FOR OPERATING A ROBOT

The invention relates to a robot, a control device for a robot, and a method for operating a robot.

Robots in general are manipulating machines, which are equipped with useful tools for automatic handling of objects, and are programmable in a plurality of motion axes, in particular with regard to orientation, position and process sequence. Robots usually have a robot arm with a plurality of members and programmable controllers (control devices), which control or regulate the motion sequences of the robot arm during operation. The drives are for example electric drives.

Control devices for robots are disclosed for example in WO 2005/061187 A1.

The object of the invention is to specify an improved method for operating a robot or a control device set up accordingly, and a robot set up accordingly.

The object of the invention is fulfilled by a method for operating a robot which has a robot arm having a plurality of members following one after the other, an attaching device for attaching an end effector, and drives for moving the members, and a control device connected to the drives, having the following procedural steps:

by means of a computer program running on the control device, initiation of a command on the basis of which the robot arm, controlled by the control device, begins to execute an application step, detection of at least one condition for aborting the command from a plurality of abort conditions, aborting of the execution of the application step due to the detected abort condition, and simultaneously with the detection of the abort condition, transfer to the computer program of information about the abort condition due to which the execution of the application step was aborted.

An additional aspect of the invention relates to a control device which is set up to operate a robot arm that has a plurality of members following one after the other, an attaching device for attaching an end effector, and drives for moving the members, and is set up to operate the robot arm in accordance with the method according to the invention.

An additional aspect of the invention relates to a robot having a robot arm which has a plurality of members following one after the other, an attaching device for attaching an end effector, and drives for moving the members, and a control device according to the invention connected to the drives.

Hence, according to the invention, the execution of an application step that was initiated by the command of the control device is aborted if at least one of the abort conditions is present. With the detection of the abort condition in question, the information about the abort condition due to which the execution of the application step was aborted is likewise transferred or conveyed to the user program. Thus after abortion the control device, or the computer or user program running on it, does not need to ascertain the cause of the abort, which makes it possible for the control device to immediately generate an additional command for actuating the robot arm, assigned to the detected abort condition, on the basis of the information about the detected abort condition. This produces conditions for a quicker reaction of the control device to an aborting of the application step.

According to one embodiment of the method according to the invention, the latter has a transfer to the computer or user program of an identifier assigned to the detected abort condition. The conveyed or transferred identifier, which is executed for example as a return value, enables the control device or the computer or user program running on it to classify the abort condition in question without ambiguity. Preferably, each of the abort conditions of the plurality of abort conditions has an unambiguous identifier assigned to it, which is transferred to the control device or to the computer or user program when the abort condition in question is detected.

According to one variant of the method according to the invention, at least one of the abort conditions is produced with corresponding information from a software module. Preferably, each of the abort conditions can have its own software module assigned to it, which conveys the information for example in the form of the unambiguous identifier to the control device or to the computer or user program upon the occurrence of its abort condition.

The abort condition may be for example the reaching of a maximum force acting on the end effector, detection of an obstacle, and/or the passage of a prescribed period of time.

Depending on the embodiment of the method according to the invention, it may represent an expanded explicit definition of the command execution end of an application step.

Thus there may be provision to encapsulate controlling and regulating functionalities in standardized modules. Each module can have a module-specific abort condition, which is defined in particular by the module developer. At the same time, the possibility may exist of generating the parameterization of the abort condition automatically from the task of the particular module. The module-specific abort condition preferably monitors internal module states in general. The result of these module abort conditions is OR-linked in particular to user command abort conditions. The module can thereby trigger the end of a command independently of the user abort conditions. In addition, the module can supply a description of the reason for the abort condition becoming true, which is appended to the command return value. It is now easier to ascertain the cause of the stop or abort. With this solution, the user is no longer responsible for having to take account of module-specific properties in the user abort conditions.

Default abort conditions can be defined in the system configuration, which are OR-linked to the user abort conditions of the application. They then apply in particular system-wide. As a result, it is no longer necessary to specify obligatory aborts explicitly. The default abort condition may be in particular executed in such a way that it is not changed at the system running time, i.e., by the application. That ensures that the abort condition which is effectively utilized does not depend on the command history.

Since in a global default condition which is applicable system-wide the modules utilized are not known, it is difficult to define a generally valid abort condition that makes sense for every command utilized. For this reason, there may be provision to define optional parts of an abort condition. These optional parts have for example key words, which are associated with certain abort classes. These key words are preferably always reported later to the involved modules.

A key word could be for example SETPOINT_REACHED. That would express the fact that as soon as the set values for the command are reached the command is to be ended. A regulating module, such as for example a force or spacing regulation, could understand this key word and would initiate the end of execution of the application step accordingly. A module for manual handing of the robot would not understand this key word. That part of the abort condition would thus be ignored.

The global default abort condition can be disabled by the locally defined command abort condition of the application. This occurs for example through the use of a corresponding key word. Through citing the above key words (e.g., SETPOINT_REACHED) in the local abort condition, the evaluation of the abort condition associated therewith is switched off. That gives the user the freedom to define the part himself. Care can be taken that the described manipulations of the default abort condition or the switching off thereof apply to only one command.

The abort condition can be organized into numbered partial expressions. Then each command can supply as its return value the signal and the number of the expression that led to the fulfillment of the abort condition. It is entirely possible for a plurality of expressions to be fulfilled simultaneously. In this case, preferably all signals and expression numbers are returned. These can be examined by the application at any desired later time.

Dedicated acyclical abort conditions may be specified. These are swapped out for example into an interrupt service routine. The associated interrupt is preferably triggered by events or sensors that are used in the abort condition. In this way, this part of the abort condition is not evaluated cyclically, but only in the case of signal changes or special events. The result is again OR-linked to the command abort condition. An advantage of this solution may be that the program sequence of the robot program (user program) is not interrupted; i.e., the application developer does not have to swap out parts of his application into an interrupt service routine, or program them explicitly. It is not the application but the command that is interrupted.

One example of an exemplary embodiment of the invention is depicted in the attached schematic drawings. The figures show the following:

FIG. 1 a robot with a robot arm and a control device, and

Figure 2:
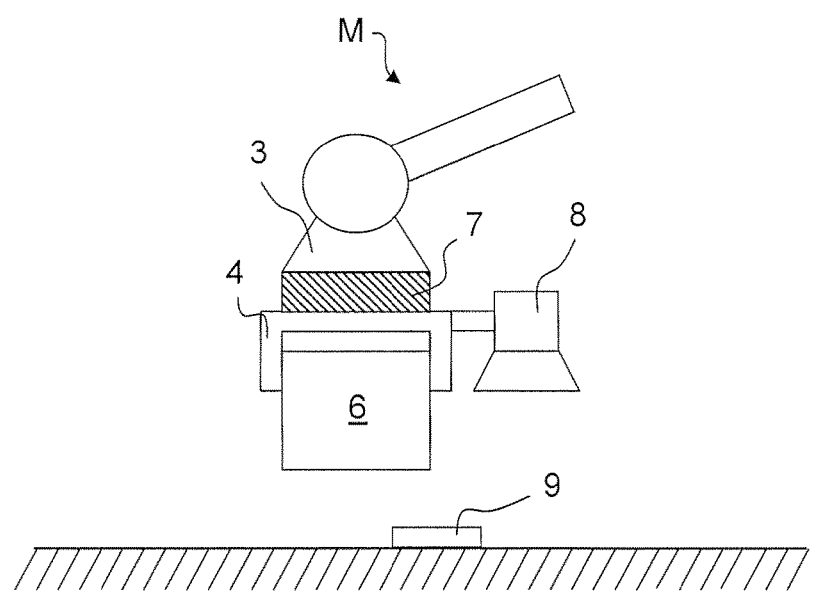

FIG. 2 an end effector in the form of a gripper, which grips an object and is attached to an attaching device of the robot arm.

FIG. 1 shows a robot R, which has a robot arm M and a control device S. The robot arm M represents essentially the movable part of the robot R, and includes a plurality of members 1 following one after the other, which are connected with each other by means of joints 2. At one of its ends the robot arm M has an attaching device 3 for example in the form of a flange, to which for example an end effector in the form of a gripper 4 may be attached. The gripper 4 has for example gripping jaws 5, by means of which the gripper 4 is able to hold an object 6, so that the latter can be moved by means of the robot R. The gripper 4 with the gripped object 6, the attaching device 3 and parts of the robot arm M are shown in greater detail in FIG. 2.

The robot arm M also has drives, not shown in greater detail, connected to the control device S, by means of which the members 1 can be moved relative to each other in reference to axes assigned to the joints 2.

The drives are for example electric drives, and are actuated by the control device S when the robot is in automatic operation, so that the attaching device 3 or a so-called tool center point of the robot R executes a predefined motion automatically. To this end, a corresponding user program runs on the control device S. The control device S may be defined in particular in such a way that it regulates the drives during automatic operation. The gripper 4 is also connected to the control device S, so that the latter is able to control a gripping and releasing of the object 6.

In the case of the present exemplary embodiment, the gripper 4 has a force/torque sensor 7 and a camera 8, which are likewise connected to the control device S, so that the latter has access to signals produced by the force/torque sensor 7 and by the camera 8.

In the case of the present exemplary embodiment, the user program is designed so that it gives a command which is intended to execute an application step of the current application of the robot R. Furthermore, the control device S or the user program running on it is designed so that this command is active until at least one of a plurality of prescribed abort conditions is fulfilled.

In the case of the present exemplary embodiment, the abort conditions may be for example the following.

A first abort condition is the attainment of a minimum force $F_{min}$ acting on the object 6 or on the gripper 4, for example 10 N. The force acting on the object 6 or on the gripper 4 is ascertained in particular using the force/torque sensor 7 and is evaluated by the control device S.

A second abort condition is the detection of an obstacle 9, with which the gripper 4 or the object 6 may potentially collide. The obstacle 9 may be detected by means of image records recorded by the camera 8, which are evaluated for example by the control device S.

A third abort condition is the expiration of a prescribed period of time T, for example 55 seconds, starting from the beginning of the command.

In the case of the present exemplary embodiment, an identifier for example in the form of a return value is assigned to each of the abort conditions.

In the case of the present exemplary embodiment, the control device S is set up or the user program running on the control device S is designed so that when at least one of the abort conditions is present the control device S not only halts the command, but a notification or indication about the existing abort condition is also conveyed to the control device S for example in the form of the associated identifier, for example in the form of the corresponding return value. Based on this information, the application running on the control device S, or the user program running on the control device S, is able to decide directly what action is to be taken based on the specific abort condition, without ascertaining the cause of the abort again.

This can be programmed for example using the following pseudo-codes:

Return_value=robot_command( . . . , 1:=force>10 N, 2:=object_detected=true, 3:=running_time>55 sec.)
call function(return_value)

For example, if the cause of the abort was the detection of the obstacle 9, i.e., the second abort condition, then function (2) is called. Now the abort causes are returned, which means for example that the cause of the abort no longer has to be ascertained by the user.

In the case of the present exemplary embodiment, the control device S or the user program running on the control device S is designed so that in addition the in particular user-defined abort conditions are augmented by default abort conditions. These default abort conditions are defined for example by participating control modules, i.e., on the basis of the force ascertained by means of the force/torque sensor 7 and of the obstacle 9 possibly detected by means of the camera 8.

In the case of the present exemplary embodiment, the user program may be designed is such a way that controlling and regulating functionalities are divided up or encapsulated in particular in standardized modules, i.e., in software modules. Each module can have a module-specific abort condition, which is defined in particular by the module developer. In this case the possibility exists to generate the parameterizing of the abort condition automatically from the particular module task. The module-specific abort condition monitors for example in general internal module states. The result of these module abort conditions may be OR-linked for example with user command abort conditions. The module can thereby trigger the end of a command independently of the user abort conditions. In addition, the module may have a description of the reason for the occurrence of the abort condition, which is added to the command return value. That can make it easier to ascertain the reason for stopping the command. With this solution, the user is no longer responsible for having to take into account module-specific properties in the user abort condition.

In the case of the present exemplary embodiment, for example, a "force module" assigned to the force/torque sensor 7, an "object detection module" assigned to the camera 8 or a "time module" assigned to the time period T can deliver their own abort criteria. In the system these modules, which are implemented in particular as software modules, each have their own unambiguous identifier. The latter is returned as the cause of the abort. In the case of the present exemplary embodiment, this may be realized as follows:

The "force module" has for example the identifier K20, the "object detection module" has the identifier K23 and the "time module" has the identifier K18. Based on the identifier conveyed, the application running on the control device S or the user program running on the control device S can decide directly what action is to be performed based on the specific abort condition, without ascertaining the reason for the abort again. This can be programmed by means of the following pseudocodes.
Return_value=robot_command( . . . , 1:=force>10 N, 2:=object_detected=true, 3:=running_time>55 sec.)
call function (return value).

Now if the "object detection module" interrupted the command, the function (K23) is called.

In addition, it can be provided that default abort conditions are defined in the system configuration of the control device S, which are OR-linked to the abort conditions of the application defined by the user. They then apply system-wide. As a result, it is no longer necessary to specify obligatory aborts explicitly.

Preferably, the default abort condition cannot and may not be changed at system running time, i.e., by the application. That ensures that the abort condition which is effectively utilized does not depend on the command history.

Dedicated acyclical abort conditions may also be specified. These are swapped out for example into an interrupt service routine of the control device S. The associated interrupt is triggered for example by events or sensors which are used in the abort condition. In this way, this part of the abort condition is not evaluated cyclically, but only in the case of signal changes or special events. The result can in turn be OR-linked to the command abort condition. An advantage of this solution is that the program sequence of the robot program or user program is not interrupted; that is, the program developer does not have to swap out parts of his application into an interrupt service routine or program them explicitly. It is not the application, but the command that is interrupted.

The invention claimed is:

1. A method for operating a robot, which has a robot arm having a plurality of links following one after the other, an attaching device for attaching an end effector and drives for moving the links, and a control device connected to the drives, having the following procedural steps:
   using a computer program running on the control device, initiation of a command on the basis of which the robot arm, controlled by the control device, begins to carry out an application step,
   detection of an abort condition of the command from a plurality of abort conditions, wherein the abort condition is the attainment of a maximum force acting on the end effector, a detection of an obstacle and/or an expiration of a prescribed time period,
   aborting of the execution of the application step on the basis of the detected abort condition while continuing to run the computer program until an additional command is initiated,
   in response to the detection of the abort condition, conveying to the computer program information about the nature of the abort condition on the basis of which the execution of the application step was aborted,
   determining with the computer program an additional command to be initiated on the basis of the information about the nature of the abort condition, and
   acyclically evaluating at least one abort condition, wherein the abort condition in question is assigned to an interrupt service routine and is triggered on the basis of events and/or sensors.

2. The method according to claim 1, further comprising conveying to the computer program an identifier assigned to the detected abort condition.

3. The method according to claim 1, wherein the additional command is assigned to the detected abort condition, the method further comprising, in response to the information about the detected abort condition, initiating the additional command to actuate the robot arm by means of the control device.

4. The method according to claim 3, wherein each of the abort conditions of the plurality of abort conditions has a unique identifier assigned to it, which is conveyed to the computer program upon detection of the abort condition in question.

5. The method according to claim 1, wherein at least one of the abort conditions is produced with corresponding information from a software module.

6. The method according to claim 1, wherein at least one of the plurality of abort conditions has a software module assigned to it, which passes to the computer program information about its abort condition upon detection of the abort condition in question.

7. An apparatus for operating a robot, comprising: a control device that is set up to operate a robot arm having a plurality of links following one after the other, an attaching device for attaching an end effector, and drives for moving the members,
   wherein the control device operates the robot arm according to the method of claim 1.

8. The apparatus of claim 7, further comprising:
   a robot arm that has a plurality of links following one after the other, an attaching device for attaching an end effector, and drives for moving the members,
   wherein the control device is connected to the drives for moving the robot arm.

9. The method according to claim 1, wherein the information about the abort condition includes information that characterizes the nature of the abort condition.

10. A method for operating a robot, the robot including a robot arm having a plurality of links following one after the other, an attaching device for attaching an end effector, drives for moving the links, and a control device connected to the drives, the method comprising:

using a computer program running on the control device, initiating a command on the basis of which the robot arm, controlled by the control device, begins to carry out an application step;

detecting an abort condition of the command from a plurality of abort conditions, wherein the abort condition is the attainment of a maximum force acting on the end effector, a detection of an obstacle and/or an expiration of a prescribed time period;

aborting the execution of the application step on the basis of the detected abort condition while continuing to run the computer program until an additional command is initiated;

in response to the detection of the abort condition, conveying to the computer program information identifying the nature of the abort condition on the basis of which the execution of the application step was aborted;

classifying the abort condition with the computer program as being one of the plurality of abort conditions on the basis of the information about the nature of the abort condition; and acyclically evaluating at least one abort condition, wherein the abort condition in question is assigned to an interrupt service routine and is triggered on the basis of events and/or sensors.

* * * * *